United States Patent
Matsuoka et al.

(10) Patent No.: US 7,023,455 B2
(45) Date of Patent: Apr. 4, 2006

(54) APPARATUS AND METHOD FOR PROCESSING VIDEO SIGNAL

(75) Inventors: Masaaki Matsuoka, Tokyo (JP); Yoshihiro Honma, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 10/660,912

(22) Filed: Sep. 11, 2003

(65) Prior Publication Data

US 2004/0056880 A1 Mar. 25, 2004

(30) Foreign Application Priority Data

Sep. 20, 2002 (JP) ........................... 2002-276050

(51) Int. Cl.
*G09G 5/00* (2006.01)

(52) U.S. Cl. ....................................... 345/660

(58) Field of Classification Search .......... 345/660–671
See application file for complete search history.

(56) References Cited

U.S. PATENT DOCUMENTS

2002/0097327 A1 * 7/2002 Yamasaki ................... 348/239
2002/0154228 A1 * 10/2002 Matsumura .............. 348/240.2
2003/0222998 A1 * 12/2003 Yamauchi et al. .......... 348/262

* cited by examiner

*Primary Examiner*—Jeffery A. Brier
*Assistant Examiner*—Eric Woods
(74) *Attorney, Agent, or Firm*—Cowan, Liebowitz & Latman, P.C.

(57) ABSTRACT

To improve image quality, to shorten a processing time, and to reduce power consumption during zooming operation, or to display an enlarged image with high definition, an image signal processing apparatus of the present invention includes: an image pickup element for picking up an image; a recording unit for recording the picked-up image in a recording medium; a memory area in which the picked-up image read out from the recording medium is temporarily stored; a re-size circuit for reading out image from the memory area and re-sizing the read-out image; an image display memory area in which the image re-sized by the re-size circuit is temporarily stored to be displayed; and a re-size display circuit for reading out image of a desired area from the image display memory area to re-size and display the read-out image of the desired area.

11 Claims, 4 Drawing Sheets

APPARATUS AND METHOD FOR PROCESSING VIDEO SIGNAL

BACKGROUND OF THE INVENTION

1. Field of the Invention

The present invention relates to an apparatus and method for processing a video signal. In particular, the invention relates to a video signal processing apparatus such as an electronic still camera or a video camera which has a liquid crystal monitor, and which is operated exclusively by battery driving, and a video signal processing method for use therein.

2. Related Background Art

A video signal processing apparatus of this sort is described in JP 10-336494 A. An image of a desired object is captured by a solid-state image pickup device and then an image signal representing the object image is converted into digital image data to be recorded in a recording medium such as a memory card. Then, the recorded image data can be arbitrarily read out so that the image represented by the image data can be reproduced on a liquid crystal monitor which is mounted on the apparatus.

As for such a digital camera, there is known one in which an image in a subject area can be enlarged and displayed during reproduction, and JP 10-336494 A discloses a digital camera with a zoom display function. That is to say, this type of digital camera includes two frame memories: a first frame memory for storing image data of a reproduced image; and a second frame memory for storing a selection frames used to select a subject area. The selection frame is displayed so as to be superimposed on the reproduced image. If a user selects a selection frame of a desired magnification to move the selection frame to a subject area, then the image is enlarged onto the first frame memory by the pixel interpolation method to be displayed on a liquid crystal monitor.

However, in the conventional digital camera, the contents of the frame memory are updated whenever an image is enlarged. Thus, a period of time required for a memory access and an enlargement processing which are caused every time an image is enlarged is felt as a stress by a user who is enlarging an image while checking a state of the magnification. In addition, an excessive electric power is consumed every time an image is enlarged. Moreover, the frame memory is a display memory for the liquid crystal monitor, and hence an image on the frame memory is rougher than that of a captured image. Nevertheless, since in this digital camera, an enlarged image is obtained by enlarging and interpolating a rough image on the frame memory to construct a new frame memory, an image after determination of the magnification is considerably rough.

In addition thereto, when an image which was enlarged once is to be reduced, it is necessary to newly reconstruct a frame memory through the expansion of the compressed image data of the original image and further enlarge the reconstructed image. In this case, it takes a longer processing time and larger power consumption as compared with the case of enlargement of an image.

SUMMARY OF THE INVENTION

The present invention has been made to solve all of or at least one of the above-mentioned problems associated with the prior art.

It is, therefore, an object of the present invention to provide an apparatus and a method for processing a video signal with which re-size display is carried out following the operation by a user with less power consumption until re-size magnification is determined, and a fine image is displayed after the determination of the magnification.

In accordance with the principles of the present invention, the above and other objectives are realized in an image display device comprising a first re-size means for reading out image data from a first memory and for re-sizing the read-out image data, a second memory for storing the image data re-sized by the first re-size means, a display control means for reading out image data from the second memory and re-sizing the image data in accordance with a magnification change operation so that the display means displays thereon an image of the re-sized image data, and a control means which instructs the display control means to make the display means display the re-sized image without newly reading out the image data from the first memory when the magnification change operation is being carried out, and which, after the magnification changing operation is fixed, instructs the first re-size means to resize image data newly read out from the first memory in accordance with contents of the fixed magnification change operation.

When resolution of the image data read out from the first memory becomes insufficient after the magnification change operation is fixed, the image data is stored in the second memory without being re-sized and an image in a desired area is read out from the second memory by the display control means to be displayed in the re-sized form. Further, when the contents of the fixed magnification change operation correspond to a predetermined condition, the control means stores the image data newly read out from the first memory into the second memory without re-sizing it. An image displaying method and a program computer-readably recorded on a recording medium which include similar features are also described.

In further accord with the present invention, a video signal processing apparatus comprising an image pickup means for picking up an image, a first memory for storing the picked-up image, a re-size means for reading out the image from the first memory and resizing the read-out image, a second memory for storing therein the image re-sized by the re-size means in order to display the image, and a resize display means for reading out an image in a desired area from the second memory to re-size and display the image in the desired area. The re-size display means reads out the image in the desired area to re-size and display the read-out image while a desired magnification change operation is carried out. After the magnification change operation is fixed, an original image is read out from the first memory and re-sized by the re-size means to be stored in the second memory, and the desired area of the re-sized image is displayed without re-sizing. When the resolution of the original image becomes insufficient in enlarged image display, after the magnification change is fixed, the original image is stored in the second memory without being resized and the image in the desired area is read out from the second memory by the re-size display means to be displayed in the re-sized form. A video signal processing method including similar features is also described.

The video signal processing apparatus further comprises a compression means for compressing picked-up image and an expansion means for expanding the compressed image. The video signal processing apparatus may also include a raster-to-block conversion means for inputting raster-sequentially an image signal and generating block-sequentially an image signal of a desired block size, a block compression means for receiving the image signal generated block-sequentially by the raster-to-block conversion means and compressing this signal, a block expansion means for expanding the image signal which is received block-sequentially and compressed by the compression means and block-to-raster conversion means for receiving block-sequentially an image signal and generating an image signal raster sequentially.

Other objects and features of the present invention will be made clear from the following description of a preferred embodiment and the accompanying drawings.

DESCRIPTION OF THE PREFERRED EMBODIMENTS

A preferred embodiment of the present invention will hereinafter be described in detail with reference to the accompanying drawings.

Figure 1:
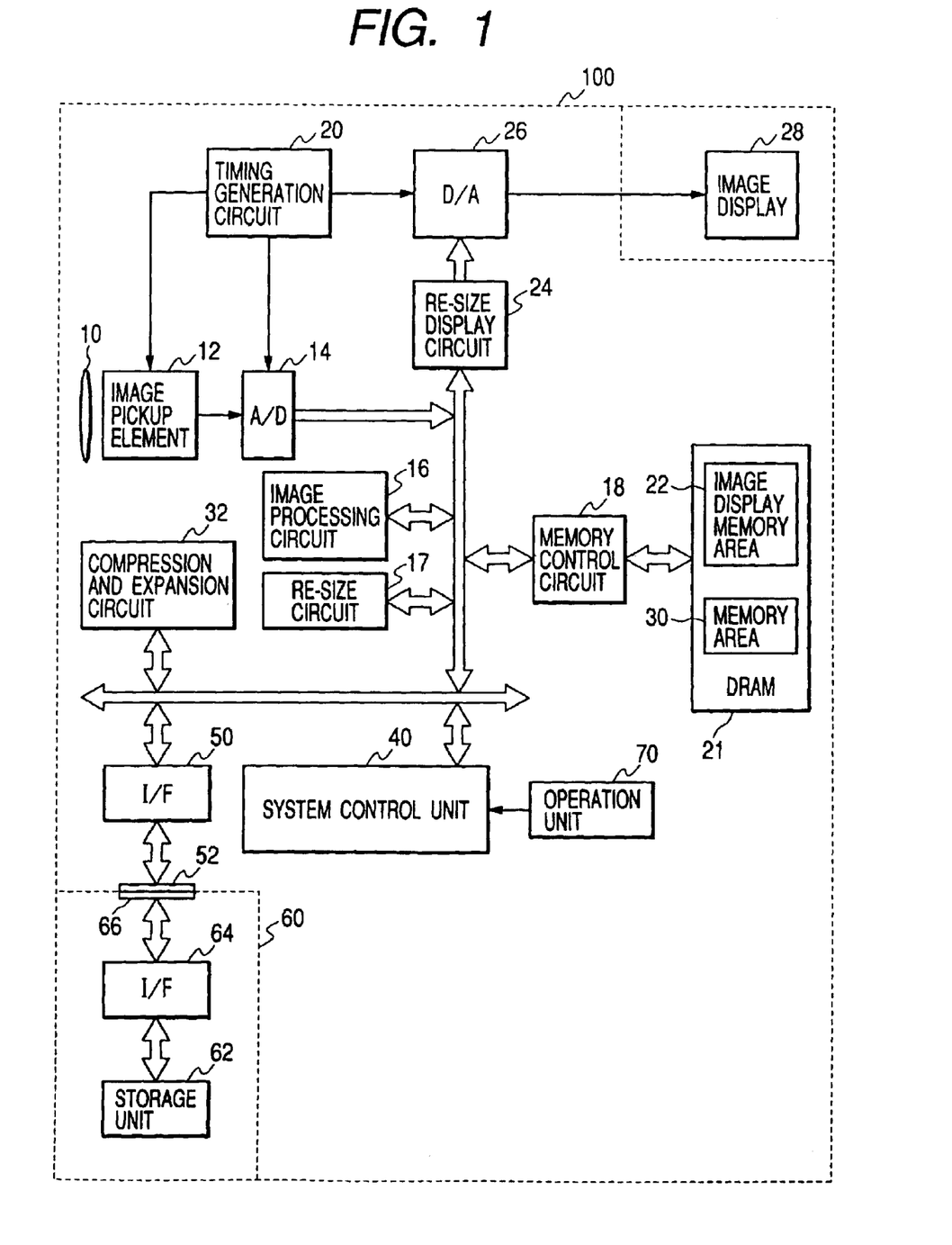
FIG. 1 is a schematic block diagram showing a configuration of a video signal processing apparatus according to an embodiment of the present invention.

FIG. 1 is a schematic block diagram showing a configuration of a video signal processing apparatus 100 according to an embodiment of the present invention.

In the figure, reference numeral 10 denotes an image pickup lens, reference numeral 12 denotes an image pickup element for converting an optical image into an electric signal, and reference numeral 14 denotes an A/D converter for converting an analog signal outputted from the image pickup element 12 into a digital signal. Reference numeral 16 denotes an image processing circuit which serves to subject data outputted from the A/D converter 14 to color carrier removal, aperture correction, gamma correction, and the like to produce a luminance signal and at the same time, serves to subject the data outputted from the A/D converter 14 to color interpolation, matrix conversion, gamma processing, gain adjustment, and the like to produce color difference signals to thereby form image data of a YUV format. Reference numeral 17 denotes a re-size circuit for re-sizing image data into that of a desired size. Reference numeral 18 denotes a memory control circuit for controlling an image display memory area 22 and a memory area 30 of a DRAM 21.

Reference numeral 20 denotes a timing generation circuit for supplying a clock signal and a control signal to each of the image pickup element 12, the A/D converter 14, and a D/A converter 26. The timing generation circuit 20 is controlled by a system control unit 40.

Reference numeral 24 denotes a re-size display circuit for re-sizing image data in a desired area which is read out from the image display memory area 22, in order to display the desired area on an image display unit 28, reference numeral 26 denotes the D/A converter, and reference numeral 28 designates the image display unit composed of a television monitor or a liquid crystal monitor corresponding thereto.

It is possible to realize an electronic viewfinder from the following procedure. An image signal outputted from the image pickup element 12 is inputted to the image processing circuit 16 through the A/D converter 14 and then image data thereof is re-sized in the re-size circuit 17 if necessary. Then, the image data thus processed is successively inputted to the image display memory area 22 through the memory control circuit 18. Subsequently, the inputted image data is subjected to a re-size display processing in the re-size display circuit 24 as required and is successively displayed an image thereof on the image display unit 28 through the D/A converter 26. However, this embodiment is not limited to this procedure or processing. For example, the image data obtained through the A/D conversion may be temporarily stored in the image display memory area 22, and then the output image data from the image display memory area 22 may be outputted to the image display unit through the image processing circuit 16, the re-size circuit 17, the re-size display circuit 24, and the D/A converter 28.

Reference numeral 30 denotes a memory area in which image data of a captured image is to be stored. Image data can be exchanged between the memory area 30 and a recording medium 60.

Reference numeral 32 denotes a compression and expansion circuit for compressing and expanding image data through the adaptive discrete cosine transformation (ADCT), the reverse transformation thereof, and the like.

In this embodiment, the image signal outputted from the image pickup element 12 is inputted to the image processing circuit 16 through the A/D converter 14, then is subjected to a re-size processing in the re-size circuit 17 if necessary, and is temporarily stored in the memory area 30 through the memory control circuit 18. Then, after the image data is read out from the memory area 30 and then is compressed in the compression and expansion circuit 32, the image data is stored in the memory area 30 again through the memory control circuit 18 to attain the image pickup and recording of an image. However, the present invention is not intended to be limited to the above-mentioned means. That is to say, the image data obtained through the A/D conversion may be directly compressed after being image-processed and re-sized. Alternately, the image data obtained through the A/D conversion may be compressed, after being temporarily stored in the memory area 30 and then read out therefrom to be image-processed and re-sized.

In addition, it is possible to realize reproduction of a recorded image through the following procedure: image data of the recorded image is read out from the memory area 30 through the memory control circuit 18 to be expanded in the compression and expansion circuit 32; the image data is then re-sized in the re-size circuit 17 as required; the image data thus processed is inputted to the image display memory area 22 through the memory control circuit 18; the image data is then subjected to a re-size display processing in the re-size display circuit 24 as required; and the image data is displayed on the image display unit through the D/A converter 28. Also, if re-size functions of the re-size circuit 17 and the re-size display circuit 24 are suitably utilized as required, the reproduction zoom can be realized.

Reference numeral 40 denotes the system control unit for controlling the whole video signal processing apparatus 100. The system control unit 40 uses the DRAM 21 as a work area. Also, the system control unit 40 is constituted with a ROM in which a program used to control the video signal processing apparatus 100 and the like are stored, a CPU for executing the program, and the like.

Reference numeral 50 denotes an interface with the recording medium 60 such as a memory card, and reference numeral 52 denotes a connector through which the interface 50 is electrically connected to the recording medium 60 such as a memory card. The recording medium 60 includes a recording unit 62 composed of a semiconductor memory or the like, an interface 64 with the video signal processing apparatus 100, and the connector 66 through which the recording medium 60 is electrically connected to the video signal processing apparatus 100.

Reference numeral 70 denotes an operation unit including a magnification button with which magnification of the reproduction zoom is designated, a position button with which a position is designated, and the like.

A method of realizing the reproduction zoom by this embodiment will hereinbelow be described in detail with reference to FIGS. 2, 3, and 4. In the following description, it is assumed that a size of the recorded image is 1,600 pixels×1,200 pixels, and the image display unit 28 is constructed in the form of 752 pixels×480 lines. However, the combination of a size of the recorded image and the resolution of the image display unit is not intended to be limited thereto, and hence any combination is available.

Figure 2:
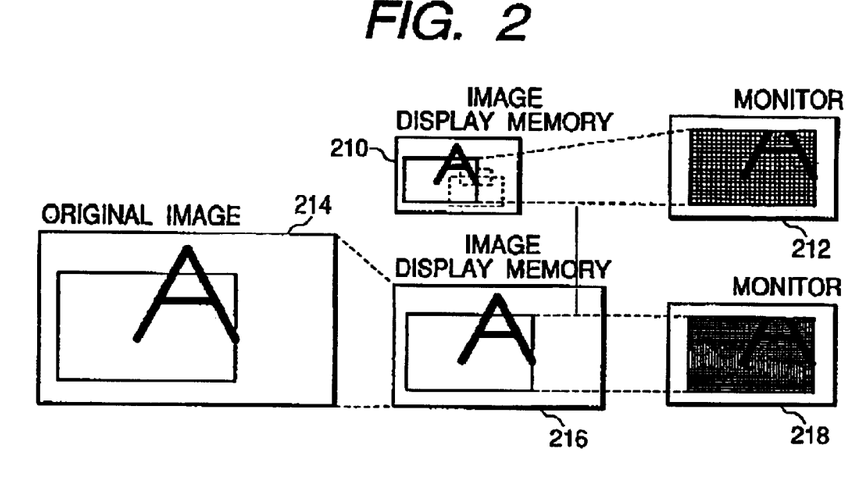
FIG. 2 is a diagram for explaining a reproduction zooming operation according to the embodiment of the present invention.

FIG. 2 shows a case where an image is enlarged from zoom magnification 1. Reference numerals 210 and 212 in FIG. 2 denote an operation example when a variable magnification manipulation is carried out to realize the display in a zoom state during setting of the re-size magnification. The image 210 is obtained by expanding image data of the recorded image in the compression and expansion circuit 32, re-sizing the thus-obtained image data in the re-size circuit 17 so that the image corresponds to an image size of the image display unit 28, and then writing the image data thus processed into the image display memory area 22. When the re-size magnification is not yet determined, an image of a subject area within the image display memory area 22 as shown in the form of a rectangle (indicated by a solid line or a broken line) within the image 212 of FIG. 2 which is designated by the magnification button and the position button is enlarged through the interpolation process to be displayed by the re-size display circuit 24. With this method, the monitor image becomes rough as shown in the image 212. However, since the re-size display can be realized by only changing over a read area, it is possible to attain the reproduction zoom quickly and with less power consumption.

Reference numerals 214, 216 and 218 in FIG. 2 denote an operation example after contents of the variable magnification manipulation are determined, i.e., the re-size magnification is determined. The image 214 shows a recorded original image. After image data of the recorded original image is expanded in the compression and expansion circuit 32, the image data of the original image is newly re-sized with a predetermined magnification determined through the variable magnification manipulation in the re-size circuit 17 so that the image becomes of image quality necessary and sufficient for the display resolution of a display device, and then the image data thus processed is written into the image display memory area 22 in a manner as shown in the image 216 in FIG. 2.

While the zoom state during which the variable magnification manipulation is conducted is displayed, an image whose image data is already stored in the image display memory area, is enlarged to be displayed. This stored image to be displayed was subjected to the reduction processing such as thinning-out of the image data, and therefore the resolution thereof is deteriorated.

At this time, though the displayed image is rough, the display can be speedily carried out all the more since no access to the original image data in the memory 60 is made.

After the variable magnification manipulation is completed to determine the magnification, the display state shown in the image 212 in FIG. 2 is changed over to the display state shown in the image 218 in FIG. 2. In this case, of the image data of the image shown in the image 216 in FIG. 2, the image data in the area designated by the position button is not re-sized. Therefore, enlarged display of an image having high definition can be realized.

When the zoom magnification is not so large, i.e., the final display resolution is lower than the resolution of the original image, the original image is reduced from the image shown in the image 214 in FIG. 2 to the image shown in the image 216 in FIG. 2.

Figure 3:
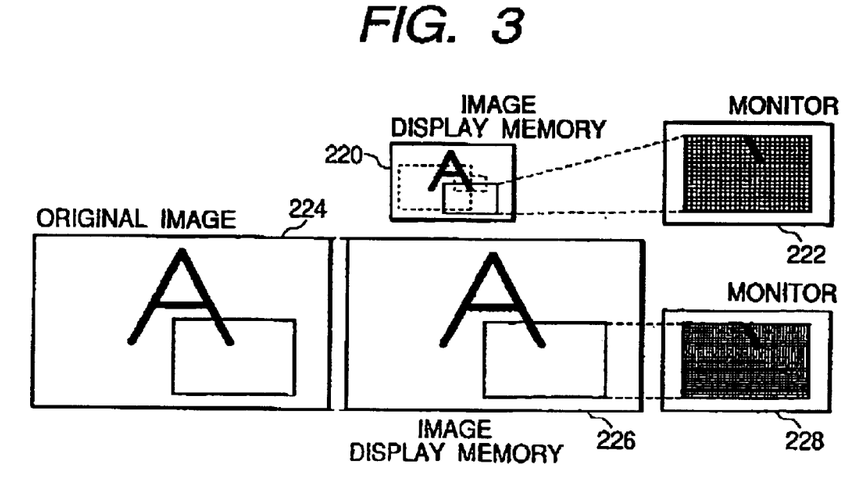
FIG. 3 is a diagram for explaining the reproduction zooming operation according to the embodiment of the present invention when magnification is at a limit of original image resolution.
Figure 4:
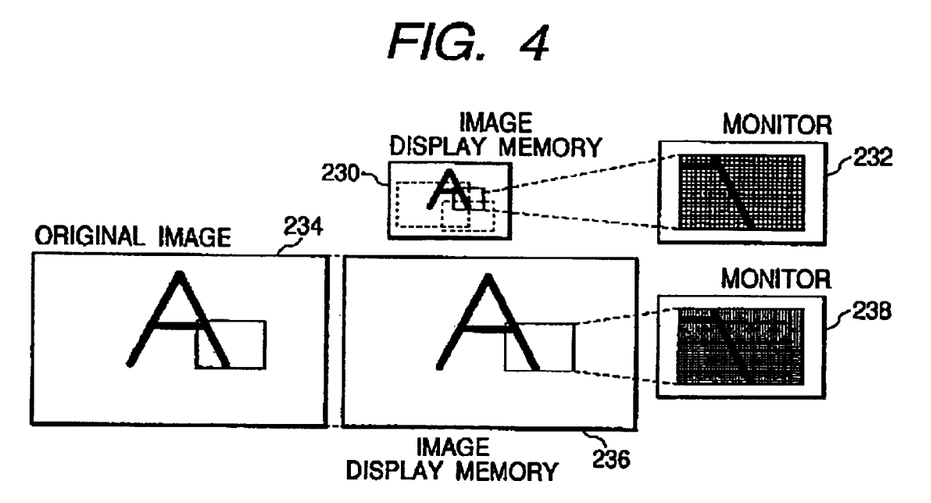
FIG. 4 is a diagram for explaining the reproduction zooming operation according to the embodiment shown in FIG. 1 when magnification is beyond the limit of original image resolution.

FIG. 3 shows a state in which the zoom magnification is increased up to a level higher than that in the state of FIG. 2 so that the display resolution becomes just equal to the resolution of the original image.

Reference numerals 220 and 222 in FIG. 3 denote states of the image display memory area and the monitor in the middle of carrying out the variable magnification manipulation, respectively. Similarly to the case of FIG. 2, while the zoom state at a time when the variable magnification manipulation is being conducted is displayed, an image whose the image data is already stored in the image display memory area, is enlarged to be displayed. This stored image to be displayed was subjected to the reduction processing such as thinning-out of the image data, and the resolution thereof is deteriorated.

In other words, though the image quality of the displayed image is deteriorated, the image display can be speedily carried out all the more since no access to the original image data in the memory 60 is made.

On the other hand, reference numerals 224, 226 and 228 in FIG. 3 denote a state at a time when the variable magnification manipulation is carried out and then the display of a zoom state is carried out during setting of the re-size magnification.

After the recorded original image data is expanded in the compression and expansion circuit 32, the original image data is then newly re-sized with a predetermined magnification determined through the variable power magnification in the re-size circuit 17 so that the image becomes of image quality suitable for the display resolution of a display device, and the image data thus processed is written into the image display memory area 22 in a manner as shown in the image 226 in FIG. 3.

It should be noted that the re-size processing executed by the re-size circuit 17 when the original image data is inputted to the image display memory becomes unnecessary.

Then, the display state of the image 222 in FIG. 3 is changed over to the display state as shown in the image 228 in FIG. 3. In this case, of the image data in the image 226 in FIG. 3, the image data in the area designated by the position button is not re-sized. Therefore, similarly to FIG. 2, the image having high definition is displayed.

If the zoom magnification is further increased from the state of FIG. 3, i.e., the enlargement rate is increased so that the resolution of the original image becomes lower than that of a display device, the image quality in case of enlargement made by the re-size circuit 17 will become equal to that in case of enlargement made by the re-size display circuit 24. Accordingly, when the magnification is set equal to or larger than that shown in FIG. 3, it is more advantageous to re-size the image by only the re-size display circuit 24 as shown as images 230, 232, 234, 236 and 238 in FIG. 4 in terms of a capacity of the image display memory area 22, and the like. This is because the re-size processing for image data of the whole image is required for the image display memory, whereas only the image data in the image area intended to be displayed needs to be re-sized in the re-size display circuit. In addition, since an access speed to the memory 60 such as a memory card is generally slower than that to an internal memory, the processing speed is also easy to be increased.

Figure 5:
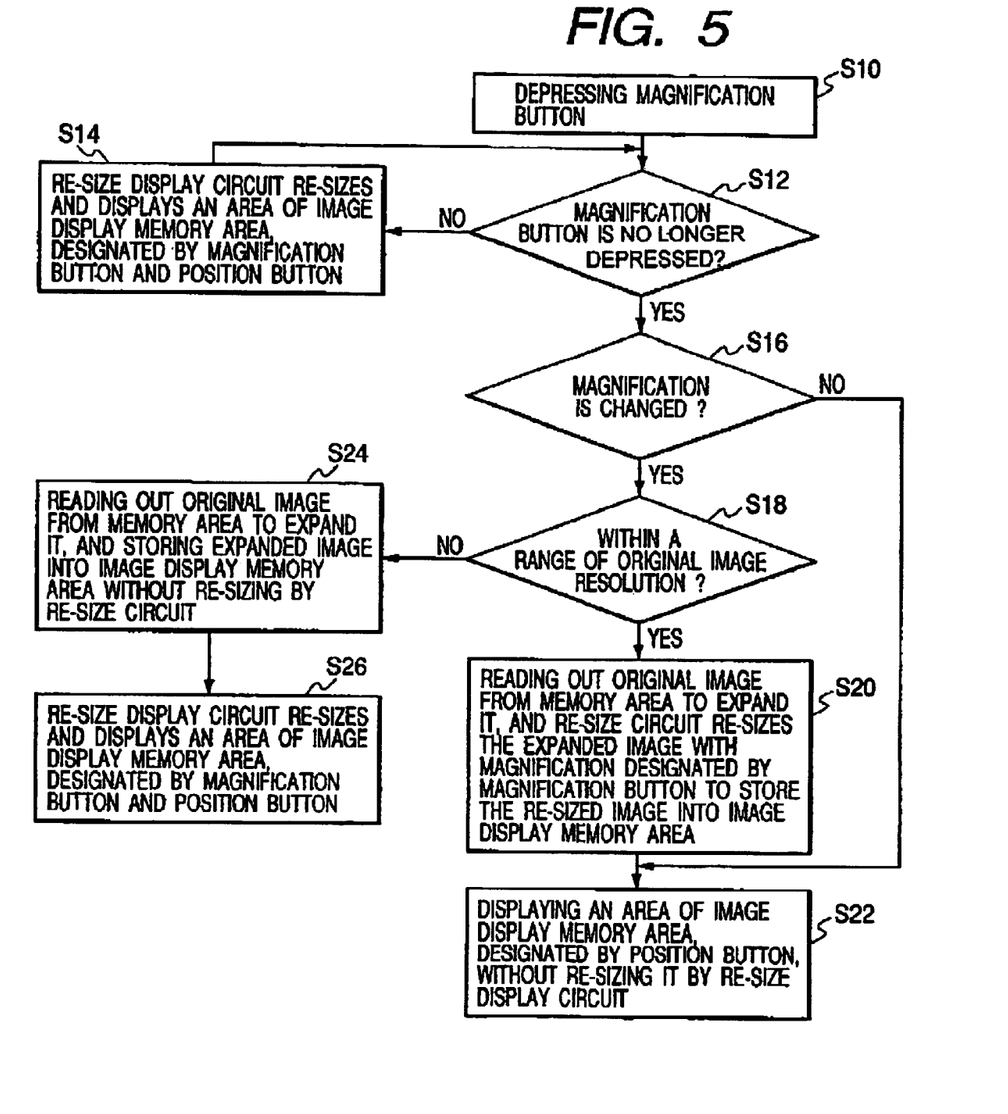
FIG. 5 is a flow chart for explaining the reproduction zooming operation according to the embodiment of the present invention.

FIG. 5 shows a reproduction zoom processing sequence in this embodiment. When the magnification button is depressed (Step S10), the re-size display circuit 24 re-sizes and displays an image of an area of the image display memory area 22 designated by the magnification button and the position button (Step S14). This operation is continuously carried out until it is detected that the magnification button is no longer depressed to determine the magnification (Step S12). When the magnification button is free from its depression, the re-size circuit 17 re-sizes the original image to reconstruct the image data in the image display memory area 22 (Step S20), and then an area designated by the position button is displayed without the image data therein being re-sized by the re-size display circuit 24 (Step S22). At this time, when the display magnification is not changed (Step S16), a currently stored image data in the image display memory area 22 is used as it is to, display the area designated by the position button without the image data therein being re-sizes for the display (Step S22).

In addition, when the resolution of the enlarged image is beyond a range of the resolution of the original image (Step S18), the image data of the original image is written into the image display memory area 22 with its size being held without being interpolated and enlarged (Step S24), and the re-sizes and display circuit 24 re-sizes and displays the area designated by the magnification button and the position button (Step S26).

As can be readily understood from the above-mentioned description, according to the present invention, since the image display memory area is not reconstructed until the magnification is determined, it is possible to eliminate a processing time and power consumption caused by a memory access and a re-size processing accompanying such reconstruction. After determination of the magnification, since the image display memory area is reconstructed from the original image, a fine enlarged image can be displayed.

It is to be understood that the present invention is not intended to be limited to the above-mentioned embodiment, and hence the various changes will be made without departing from the spirit and scope of the invention. The scope of the invention is, therefore, to be defined solely by the appended claims.

What is claimed is:

1. An image display device, comprising:
   first re-size means for reading out image data from a first memory that stores therein image data, and re-sizing the read-out image data;
   a second memory for storing the image data re-sized by the first re-size means;
   display control means for reading out image data from the second memory and re-sizing the read-out image data in accordance with a magnification change operation for an image to make display means display thereon an image of the re-sized image data; and
   control means for, while the magnification change operation is carried out, instructing the display control means to make the display means display thereon the image re-sized by the display control means without newly reading out the image data from the first memory, and after the magnification changing operation is fixed, instructing the first re-size means to re-size image data newly read out from the first memory, in accordance with contents of the fixed magnification change operation, wherein when resolution of the image data read out from the first memory becomes insufficient in enlarged image display, after the magnification change operation is fixed, the image data is stored in the second memory without being re-sized and an image in a desired area is read out from the second memory by the display control means to be displayed in the re-sized form.

2. An image display device according to claim 1, wherein when the contents of the fixed magnification change operation correspond to a predetermined condition, the control means stores image data which is newly read out from the first memory, into the second memory without re-sizing.

3. An image displaying method, comprising:
   a first re-size step of reading out image data from a first memory that stores therein image data, and re-sizing the read-out image data;
   a storing step of storing the image data re-sized in the first re-size step in a second memory; and
   a display control step of reading out image data from the second memory and re-sizing the read-out image data in accordance with a magnification change operation for an image to make a display device display thereon an image of the re-sized image data,
   wherein while the magnification change operation is carried out, the display control step re-sizes and displays the image data read out from the second memory without newly reading out the image data from the first memory, and after the magnification change operation is fixed, the display control step makes the first re-size step re-size image data newly read out from the first memory, in accordance with contents of the fixed magnification change operation, and
   wherein when resolution of the image data read out from the first memory becomes insufficient in enlarged image display, after the magnification change operation is fixed, the image data is stored in the second memory without being re-sized and an image in a desired area is read out from the second memory in the display control step to be displayed in the re-sized form.

4. An image displaying method according to claim 3, further comprising the step of, when the contents of the fixed magnification change operation correspond to a predetermined condition, storing image data which is newly read out from the first memory after the magnification change operation is fixed, without re-sizing.

5. A program computer-readably recorded on a recording medium, for making a computer execute an image displaying method, comprising:
   a first re-size module for reading out image data from a first memory that stores therein image data, and re-sizing the read-out image data;

a storing module for storing the image data re-sized in the first re-size module in a second memory; and a display control module for reading out image data from the second memory and re-sizing the read-out image data in accordance with a magnification change operation for an image to make a display device display thereon an image of the re-sized image data, wherein the magnification change operation is carried out, the display control module re-sizes and displays the image data read out from the second memory without newly reading out the image data from the first memory, and after the magnification change operation is fixed, the display control module makes the first re-size module re-size an image of image data newly read out from the first memory and displays the re-sized image data, in accordance with contents determined through the magnification change operation, and wherein, when resolution of the image data read out from the first memory becomes insufficient in enlarged image display, after the magnification change operation is fixed, the image data is stored in the second memory without being re-sized and an image in a desired area is read out from the second memory by the display control module to be displayed in the re-sized form.

6. A video signal processing apparatus, comprising:

image pickup means for picking up an image;

a first memory for storing the picked-up image;

re-size means for reading out the image from the first memory and re-sizing the read-out image;

a second memory for storing therein the image re-sized by the re-site means, in order to display the image; and re-size display means for reading out an image in a desired area from the second memory to re-size and display the read-out image in the desired area, wherein while a desired magnification change operation is carried out, the re-size display means reads out the image in the desired area to re-size and display the image read out, and after the magnification change operation is fixed, an original image is read out from the memory and is re-sized by the re-size means to be stored in the second memory, and the desired area of the re-sized image is displayed without re-sizing, and wherein when resolution of the original image becomes insufficient in enlarged image display, after the magnification change operation is fixed, the original image is stored in the second memory without being re-sized and the image in the desired area is read out from the second memory by the re-size display means to be displayed in the re-sized form.

7. A video signal processing apparatus according to claim 6, further comprising:

compression means for compressing the picked-up image; and expansion means for expanding the compressed image.

8. A video signal processing apparatus according to claim 7, further comprising:

raster-to-block conversion means for inputting raster-sequentially an image signal and generating block-sequentially an image signal of a desired block size; and block compression means for receiving the image signal generated block-sequentially by the raster-to-block conversion means and compressing the received image signal.

9. A video signal processing apparatus according to claim 7, further comprising:

block expansion means for expanding the image signal which is received block-sequentially and compressed by compression means; and block-to-raster conversion means, for receiving block-sequentially an image signal and generating an image signal raster-sequentially.

10. A video signal processing method, comprising:

a first storing step of storing image data in a first memory;

a re-size step of reading out image data from the first memory and re-sizing the image data read out from the first memory;

a second storing step of storing the image data re-sized in the re-size step in a second memory to display the image data; and a re-size display step of reading out image data in a desired area from the second memory to re-size and display the image data in the desired area, wherein while a magnification change operation is carried out, the image data in the desired area of the second memory is read out to re-size and display the image data in the desired area, and after the magnification change operation is fixed, image data is read out from the first memory and is re-sized in the re-size step to be stored in the second memory, and the image data in the desired area in the image display memory is displayed without being re-sized, and wherein when resolution of the image data read out from the first memory becomes insufficient in enlarged image display, after the magnification change operation is fixed, the image data is stored in the second memory without being re-sized and the image in the desired area is read out from the second memory by the re-size display means to be displayed in the re-sized form.

11. A program computer-readably recorded on a recording medium for making a computer execute a video signal processing method, comprising:

an image pickup module for picking up an image;

a first storing-module for storing the picked-up image data in a first memory;

a re-size module for reading out the image from the first memory and re-sizing the read-out image;

a second storing module storing in a second memory the image re-sized by the re-size means, in order to display the image; and a re-size display module for reading out an image in a desired area from the second memory to re-size and display the read-out image in the desired area, wherein while a desired magnification change operation is carried out, the re-size display module reads out the image in the desired area to re-size and display the image read out, and after the magnification change operation is fixed, an original image is read out from the first memory and is re-sized by the re-size module to be stored in the second memory, and the desired area of the re-sized image is displayed without re-sizing, and wherein when resolution of the original image becomes insufficient in enlarged image display, after the magnification change operation is fixed, the original image is stored in the second memory without being re-sized and the image in the desired area is read out from the second memory by the re-size display module to be displayed in the re-sized form.

* * * * *

UNITED STATES PATENT AND TRADEMARK OFFICE
CERTIFICATE OF CORRECTION

| | |
|---|---|
| PATENT NO. | : 7,023,455 B2 |
| APPLICATION NO. | : 10/660912 |
| DATED | : April 4, 2006 |
| INVENTOR(S) | : Masaaki Matsuoka et al. |

It is certified that error appears in the above-identified patent and that said Letters Patent is hereby corrected as shown below:

Column 9, line 41 delete "the memory" and insert --the first memory--

Column 9, line 31 delete "re-site" and insert --re-size--

Column 10, line 39 delete "storing-module" and insert --storing module--

Signed and Sealed this

First Day of August, 2006

JON W. DUDAS
*Director of the United States Patent and Trademark Office*